US011288695B1

(12) United States Patent
Nair et al.

(10) Patent No.: US 11,288,695 B1
(45) Date of Patent: Mar. 29, 2022

(54) HIGH VALUE ACTION SELECTION USING A MACHINE LEARNING MODEL

(71) Applicant: Amazon Technologies, Inc., Seattle, WA (US)

(72) Inventors: Naveen Sudhakaran Nair, Issaquah, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 16/836,699

(22) Filed: Mar. 31, 2020

(51) Int. Cl.
*G06Q 30/02* (2012.01)
*G06N 5/04* (2006.01)
*G06N 20/20* (2019.01)

(52) U.S. Cl.
CPC .......... *G06Q 30/0211* (2013.01); *G06N 5/04* (2013.01); *G06N 20/20* (2019.01); *G06Q 30/0202* (2013.01); *G06Q 30/0224* (2013.01); *G06Q 30/0226* (2013.01)

(58) Field of Classification Search
CPC .......... G06Q 30/0211; G06Q 30/0224; G06Q 30/0226; G06Q 30/0202; G06N 5/04; G06N 20/20
See application file for complete search history.

(56) References Cited

U.S. PATENT DOCUMENTS

| | | | |
|---|---|---|---|
| 2010/0198772 A1* | 8/2010 | Silverman | G06Q 30/02 706/52 |
| 2015/0186941 A1* | 7/2015 | Anthony | G06Q 30/0242 705/14.41 |
| 2016/0155143 A1* | 6/2016 | Hsiao | G06Q 30/0283 705/14.45 |

OTHER PUBLICATIONS

High Value Customer Acquisition & Retention Modelling—A Scalable Data Mashup Approach 2019 IEEE International Conference on Big Data (Big Data) Kajanan Sangaralingam, Nisha Verma, Aravind Ravi (Year: 2019).*

* cited by examiner

*Primary Examiner* — Alexandru Cirnu
(74) *Attorney, Agent, or Firm* — Knobbe, Martens, Olson & Bear, LLP

(57) ABSTRACT

Systems and methods are provided for using a machine learning model to analyze customers data for each of a number of customers interacting with electronic commerce, and determining whether the customers are high value customers. For the high value customers, one or more high value actions are then determined by the machine learning model, the one or more high value actions representing actions previously performed by or with respect to the customers and that correlate with a likelihood of the customers reaching high value customers status. Non-high value customers may then be prompted to perform the high value action which may elevate the non-high value customers to high value customers status.

20 Claims, 6 Drawing Sheets

HIGH VALUE ACTION SELECTION USING A MACHINE LEARNING MODEL

BACKGROUND

Retailers and merchants involved in electronic commerce often track data associated with customers with whom they are involved in electronic commerce. Given customers may be associated with a plethora of services or products associated with a given retailer and the given retailer can gather data associated with each of these services or products and the corresponding customers. Further, a given retailer may prompt customers to perform certain actions associated with services or products. A given retailer may also provide an interaction with customers to provide the customers with certain opportunities. For example, given customers may be provided coupons, customers may participate in sale, customers may use a free trial of a service, etc. Based on this data, retailers and merchants may hypothesize certain activities that are deemed to have greater value to the retailer and merchants. For example, a retailer may believe that given customers using a free trial of a particular service may correlate to a greater value to a given retailer than offering a coupon for a product, though accurately predicting or determining the effects of specific actions on long term value of the customers is difficult to assess using existing approaches.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
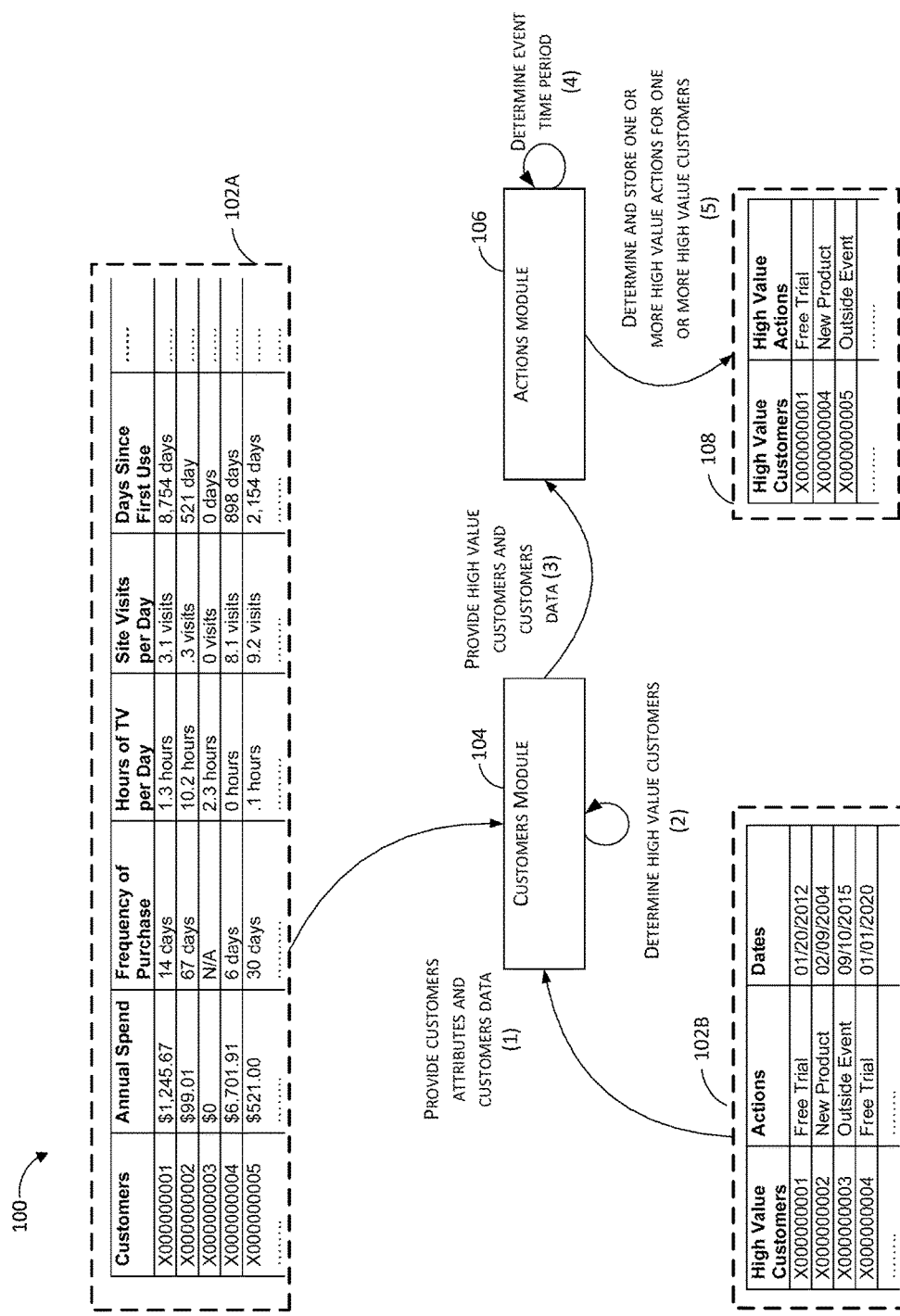
FIG. 1 is a pictorial diagram depicting a data flow of customers data being provided to an attribute service that determines high value actions for high value customers.

Generally described, aspects of the present disclosure relate to developing a holistic and scalable method for determining actions that have a greater value to a retailer or other operator of a service used by customers or other users. Such actions may be deemed high value actions and may correspond to any action that can be associated with a likelihood of providing additional value to the retailer. Determining high value actions beneficially provides a retailer with an indication of what actions have a greater likelihood of influencing the customers to provide more value to the retailer. For example, a retailer may desire to know what actions have a greater likelihood to cause customers to spend more money on certain products, spend more time on certain services, sign up for an on-going subscription, or more frequently purchase items or services. Such actions can be desirable to a retailer as they may provide an indication of what actions could be desirable for other customers to perform. However, identification of such actions using existing techniques can be a time-consuming and error-filled process that is limited in scope and not applicable to all actions.

Embodiments of the present disclosure enable a holistic and repeatable method for determining high value actions by determining these high value actions based at least in part on determined high value customers and then analyzing past actions associated with these customers using machine learning techniques described herein. High value customers may be defined as customers who meet defined attribute thresholds that are adjustable and/or may be defined in a given embodiment by an administrator of the system, such as number or frequency of site visits, hours of video content watched, money spent, frequency of purchases, metrics defining a level of overall engagement with the service, etc. More specifically, embodiments of the present disclosure can provide a repeatable and holistic method for determining high value actions by first determining high value customers according to one or more metrics and then, using machine learning models, discovering the corresponding high value actions. These embodiments can therefore identify the one or more specific high value actions that correspond to specific high value customers.

As noted above, a high value action can correspond to an action that is deemed likely to influence customers to change their behavior in a manner desired by a retailer or other service provider. For example, a retailer may desire the customers to spend more money, purchase items more frequently, spend more time on a service, become a subscriber to a service, etc. The actions desired by the retailer may be further unrelated to monetary reasoning and may include activity such as more frequent use of a free service, more diverse actions on a service, etc. The retailer may be any service or goods provider seeking to maximize their users engagement with users. For example, the retailer may be a non-profit organization, a fan club, an alumni organization, etc.

A retailer may hypothesize that certain actions are likely to have a greater effect on the behavior of the customers, though the effect may not be seen for some time (such as users being provided a free audio book then influencing that a decision of the users to sign up for an audio book subscription service many months later). The retailer may implement a downstream impact estimation to measure the impact of a given event on the downstream behavior of the users. The retailer may perform this trial-and-error method for a plurality of hypothesized actions. However, in instances where the hypothesized action does not correlate to a high value action, the trial-and-error method can be inefficient. Additionally, the trial-and-error method fails to recognize that multiple actions may together correlate to a high value action. For example, customers receiving a coupon and a follow-up reminder of the coupon may correlate to a high value action which the traditional method may be unable to identify. Further, customers may be impacted by different events at the same time and customers may react differently to the same event. For example, first customers may have a direct impact by a first event and second customers may have a delayed impact by the first event.

A given retailer may analyze customers associated with a product or service to determine the effect that an action has on the customers. Based on the effect that the action has on the customers, the action may be identified as a high value action. This trial-and-error method may be repeated for each action that a retailer hypothesizes may be a high value action. A given retailer can use this data to customize experience of customers with the retailer and incentivize certain behavior. A given retailer may identify the activities that are deemed to have greater value to the retailer and cause other customers to implement them. For example, a given retailer may identify that certain coupons are of higher value to the retailer and cause these coupons to be provided to customers at a higher rate.

The present disclosure addresses problems discussed above by identifying high value actions based on high value customers. The high value actions are identified by first identifying high value customers and then identifying the actions of the high value customers that elevated the customers to high value customers status. As described herein, the use of identified high value customers to determine high value actions can increase accuracy in determining high value actions and allows for a systematic approach to determining high value actions. For example, a plurality of machine learning models may be trained to determine a time period associated with high value customers achieving high value customers status and representing the likelihood of an event corresponding to the high value customers status. The plurality of machine learning models may be trained to determine successively shorter time periods until the time period is associated with an event that the machine learning models determine corresponds to a high value action(s) comprising one or more actions. This high value action may then be used to influence non-high value customers and influence them to reach high value customers status.

FIG. 1 is a pictorial diagram depicting a data flow of customers attributes 102A and customers data 102B being provided to an actions module 106 that determines high value actions 106 for high value customers as part of a high value actions service 100. As illustrated, the customers attributes 102A may include, for each of a potentially large number of customers (e.g., hundreds, thousands, or millions of customers), various customers attributes and corresponding customers attribute values, which may be determined based on users activity data that identifies previous actions performed by specific customers and actions performed by the retailer or other service provider with regard to specific customers. For example, customer X000000001 has the customers attribute value "$1,245.67" for the "Annual Spend" customers attribute; further, the same customer has the customers attribute value "1.3 hours" for the "Hours of TV per Day" customers attribute (which may refer to hours of video content streamed or consumed per day, in one example). While the customers attributes 102A illustrated in FIG. 1 only illustrates a limited set of customers attributes for a limited set of customers, it will be appreciated that there may be a significantly larger set of customers attributes each associated with a significantly larger set of customers beyond those illustrated in FIG. 1.

Each customers attribute may be associated with a time value in order to determine the relevant period of the customers attribute. For example, the customers attribute "Annual Spend" may correspond to a period of a year, specifically spend of customers in a year (such as the prior 12 month period) and the customers attribute "Hours of TV per Day" may correspond to a period of a day (which may be averaged over some time period, such as the past month). In some implementations, each customers attribute may correspond to the same period. Each customers attribute may be associated with any time value (e.g., year, three-month, month, 60-day, week, day, hour, etc.). Further, each customers attribute may be updated based on a corresponding update schedule. For example, each customers attribute may be updated at certain time intervals (e.g., once a day, once a week, once a year, etc.). In one implementation, each customers attribute may be updated at different time intervals. For example, a customers attribute with a longer relevant period (e.g., a year) may be updated less frequently then a customers attribute with a shorter relevant period (e.g., a day).

The customers attributes 102A may store data associated with customers of a given region or market. For example, the customers attributes 102A may be limited to European customers. In one implementation, the customers attributes 102A may store data associated with customers associated with a given retailer. In another implementation, the customers attributes 102A may store data associated with a plurality of retailers. The plurality of retailers may be entities associated with an original retailer that each provides their respective customers data to the customers attributes 102A. In one implementation, the plurality of retailers may be distinct entities that provide their data to the customers attributes 102A in order to better recognize high value actions that affect a larger pool of high value customers. This service may be used by distinct entities in order to pool resources and achieve data analysis unavailable on a single retailer level.

The customers attributes 102A may store data associated with customers that uses a product or service of a retailer. In one implementation, the customers attributes 102A may be limited to one product or service of a retailer. In another implementation, the customers attributes 102A may correspond to one or more products or services of a retailer. In the example of FIG. 1, the customers data corresponds to multiple products or services of a retailer. For example, the "Annual Spend" and "Frequency of Purchase" customers attribute may correlate to a shopping service and the "Hours of TV per Day" customers attribute may correlate to a video streaming service.

The "Customer" customers attribute within the example customers attributes 102A may correspond to a distinct customers ID number used to identify customers. The "Customer" customers attribute may be based on the product or service used by the customers. In one implementation, the "Customer" customers attribute may be based on the retailer associated with the given customers. In some implementations, given customers may have multiple "Customer" customers attributes associated with the given customers.

Some customers may not have a customers attribute value for a given customers attribute. In the example of FIG. 1, customer X000000003 has the customers attribute value "$0" for the "Annual Spend" customers attribute. In another implementation, given customers may include a designation that a value for the given customers attribute is not available. For example, in FIG. 1, customer X000000003 has the customers attribute value "N/A" for the "Frequency of Purchase" customers attribute. In other implementations, the customers data may not store data for a customers attribute of customers that do not have a corresponding customers attribute value.

The customers data 102B may store data corresponding to the customers identified in the customers attributes in order to identify any potential high value actions. The customers data 102B may correspond to information concerning a plurality of events taken by or corresponding to given customers. In one implementation, the customers data 102B may include events taken by the retailer that correspond to the given customers. Further, the customers data 102B may include any responses by the customers and the time period of the action. For example, the customers data 102B may include information that an advertisement was shown to first customers on Dec. 1, 2019 at 1:00 PM PT. Further, the customers data 102B may provide that the customers clicked on the advertisement and subsequently purchased an item corresponding to the advertisement on Dec. 2, 2019 at 5:19 AM PT. In other implementations, more or less information may be included in the customers data 102B. The customers data 102B and the customers attributes 102A may correspond to both high value customers and non-high value customers.

As illustrated in FIG. 1, at (1), the customers attributes 102A and the customers data 102B are passed to a customers module 104. Each customers attribute may correspond to one or more high value customers thresholds and the customers attributes 102A may be parsed to determine which customers exceed the relevant thresholds according to high value customers attributes. High value customers attributes may be any attributes of the customers data including, but not limited to: "Hours of TV Watched", "Annual Spend", "Hours of Shopping per Week", "Frequency of Purchase", "Average Purchase Amount", "Different TV Series or Movies Watched", "Date Since First Use", "Site Visits per Day", "Largest Purchase", "Recommendations", etc. It will be understood that the high value customers attributes may include any attributes associated with customers. For example, the customers attributes 102A may be parsed according to "Site Visits per Day." In another example, the customers attributes 102A may be parsed according to "Days since First Use" and "Hours of TV per Day." Each customers attribute may have a corresponding threshold. For example, the threshold for site visits per day may be 5 site visits per day and the threshold for hours of TV per day may be 4.5 hours. The customers data 102B may correspond to one or more actions or events concerning customers. The customers data 102B may include a time period of the one or more actions or events such as a date and/or a time. The customers data 102B may further include a plurality of actions or events for the customers. In some implementations, the customers data 102B may correspond to events corresponding to a retailer. In other implementations, the customers data 102B may correspond to events not corresponding to the retailer. In one embodiment, the customers attributes 102A and the customers data 102B may be part of the same data set.

At (2), the customers module 104 may determine which customers are high value customers based on the one or more customers attributes for parsing and the customers attribute values of high value customers may exceed the corresponding thresholds of the one or more customers attributes. It will be understood that the high value customers may be selected based on any one or more customers attributes and corresponding thresholds, including customers attributes not listed in FIG. 1. The thresholds may correlate to a maximum desired value or a minimum desired value of the customers attribute. For example, high value customers may be required to have "Annual Spend" at minimum of $1,000 and/or have "Frequency of Purchase" at maximum of 14 days. In one embodiment, an attribute may satisfy a threshold if it is equal to the threshold. In another embodiment, an attribute may not satisfy a threshold if it is equal to the threshold. In some embodiments, the most recent values for the customers attributes may be used to determine high value customers that will be further analyzed, while in other embodiments some prior snapshot of attribute data may be used (such as identifying customers that were high value customers as of the start of the current month or some other prior point in time).

In the embodiment of FIG. 1, the high value customers are determined according to high value attributes "Annual Spend" and "Days Since First Use." The corresponding thresholds may be a minimum annual spend of "$500" and a minimum days since first use of "730 days." Customers X000000001, X000000004, and X000000005 satisfy the annual spend threshold and customers X000000001, X000000002, X000000004, and X000000005 satisfy the days since first use threshold. In the example of FIG. 1, each customers attribute must meet the threshold to be designated high value customers and, therefore, the high value customers are X000000001, X000000004, and X000000005. In another embodiment, the high value customers may be determined based on meeting any of the customers attributes. For example, high value customers may correspond to customers meeting the annual spend threshold or the days since first use threshold.

As further illustrated in FIG. 1, at (3), the high value customers and the customers data are provided to the actions module 106. The high value customers may be provided as a series of customers IDs. In one implementation, the customers attributes of the high value customers may also be provided to the actions module. The customers data may be provided as a series of events and corresponding time periods as illustrated in customers data 102B.

In determining the high value customers, the customers attributes 102A includes the customers attribute "Frequency of Purchase." In (1), it may be determined that high value customers corresponds to a "Frequency of Purchase" corresponding to at least every 15 days. Therefore, it may be determined that customers X000000001 and X000000004 correspond to high value customers due to the respective frequency of purchase of each respective customers. The machine learning model may designate both X000000001 and X000000004 as high value customers based on both exceeding or meeting the threshold, regardless of the amount by which each exceeds the threshold.

Various features determined based on the high value customers' past activity and other history may further be provided as input to one or more machine learning models at the actions module 106, as will be further described below. At (4), the actions module 106 may then analyze the features and corresponding actions of the high value customers provided from the customers module 104 to determine a time period associated with a likelihood of affecting the high value customers subsequent transition into high value customers. The actions module 106 may determine one or more event time periods for the high value customers.

The high value actions service 100 may then determine one or more high value actions for customers X000000001 and X000000004 corresponding to one or more event time periods that correlate to a likelihood of the one or more event time periods having a causal relationship with the customers meeting the one or more high value customers criteria at a time subsequent to performance of the one or more events. The one or more high value actions may further include a designation of the probability of the high value actions correlating to customers becoming high value customers. For example, the high value actions service 100 may determine one or more high value actions for X000000001 and one or more high value actions for X000000004. The respective one or more high value actions may correspond to different actions or the same actions. For example, a plurality of high value customers may correspond to the same high value action and/or high value customers of a plurality of high value customers may correspond to a different high value action. Example methods will be described below for determining the high value actions using machine learning models.

In some embodiments, the high value actions service 100 may be trained to have weights associated with different actions for high value customers based on the one or more customers attributes of the high value customers. After an action is identified as a high value action for first high value customers, a weight may be assigned to the action to represent a likelihood that the action corresponds to second high value customers becoming high value customers. Based on previous high value action determinations, the high value actions service 100 may have previously determined that for high value customers based on the customers attribute "Frequency of Purchase," the action "Free Trial" is more likely to be a high value action then the action "New Product." For example, the high value actions service 100 may have previously determined, through a training process involving one or more high value customers, that "Frequency of Purchase" is more likely to be related to "Free Trial" than other actions. Each customers attribute may correspond to different weights for different actions. The weights may be based on prior high value actions determined for high value customers associated with a same or similar customers attribute. For example, if 75% of high value customers based on the customers attribute "Frequency of Purchase" are associated with a high value action of "Free Trial," a greater weight may be placed on the action "Free Trial" then other actions such as "New Product," representing a likelihood that the particular action correlates to a high value action. Further, the weight may be based on the amount that a customers attribute exceeds or passes a threshold. For example, customers with a customers attribute of 25 views per day may have greater weight placed on certain actions than customers with a customers attribute of 10 views per day where the threshold is 9 views per day. In one embodiment, an equal weight may be placed on each action of customers. The high value actions service 100 may use the weights to rank or prioritize the high value actions. For example, the high value action service 100 may rank, using weights, a first high value action higher than a second high value action based on the first high value action being identified more frequently. Further, the high value actions 100 may recommend non-high value customers to perform high value actions with higher rankings (i.e., greater weights).

Prior to the data flow illustrated in FIG. 1, the machine learning model of the actions module 106 may have been trained using training data. The training data may include, for example, input training data based on customers data of a number of customers corresponding to a given retailer. The training data provided to the machine learning model may be split into training data and test data, as is known in the art of machine learning. For example, a certain percentage of the training data may be provided to train a model to predict one or more attributes of the customers at a second time based on activity of the customers at a first time, the one or more attributes used to identify customers as a high value customers, then the remaining training data may be used to test the model's prediction capability for actions previously designated as high value actions by a human for given high value customers. The training data results (e.g., tags indicating what actions have been designated as high value actions) may have been initially determined by a retailer, a manufacturer, a distributor, consumer surveys, and/or by other methods. In some implementations, the training data may further be provided to train a model to assign weights to different actions based on the corresponding attributes. In other implementations, depending on the type of model used in a particular embodiment, the training process may not include assigning weights to different actions.

In some embodiments, all or a subset of the customers data 102B may be converted or translated into a different form by the actions module 1066 prior to the actions module 106 providing the modified information to the machine learning model. For example, while some of the customers data may be represented by numerical values, other customers data may be represented by non-numeric values. The non-numeric values may be converted into categorical variable values and treated as categorical features by the machine learning model, as is known in the art. For example, a "Favorite Service" customers attribute may initially have customers attribute values such as "video streaming service" or "food delivery service" or "personal shopping service," which may be converted to "1," "2," or "3," in one embodiment. In other embodiments, input vectors may be used that identify a categorical variable by a series of binary values (e.g., for a "Favorite Service" customers attribute, a number of bits that match the number of possible services, where a single bit is set to '1' and the other bits to '0'). Furthermore, in some embodiments, numeric values may also be converted into a different numeric form. For example, numeric values may be converted to categorical values representing different value ranges, such as instances where a linear model issued, but there is a non-linear relationship between a given feature and the result of the model.

In the example of FIG. 1, in (5), the actions module 1066 determines and stores one or more high value actions for one or more high value customers. In one embodiment, the actions module 106 may determine that, for particular high value customers, no high value action occurred. For example, the actions module 1066 may determine, based on the machine learning model, that the growth into high value customers was organic or that high value action occurred that was not captured by the customers data 102B (e.g., it occurred outside of the relevant system). The actions module 10606 may determine that that the one or more high value actions represent a probability of a certain action corresponding to a transition of customers into high-value customers. The high value customers, X000000001, X000000004, and X000000005, are each analyzed, using the machine learning model, to determine one or more high value actions. The high value actions are then provided to high value action data 108. In the example of FIG. 1, X000000001 has a "Free Trial" high value action, X000000004 has a "New Product" high value action, and X000000005 has am "Outside Event" high value action. It will be understood, that the high value customers may include more or less high value customers. In other examples, one or more of the high value customers may include multiple high value actions or a sequence of high value actions corresponding to one high value action. For example, a high value action may correspond to "Receiving a Coupon" and "Receiving a Reminder to Use the Coupon." In other examples, one or more of the high value actions may be the same as a previously determined high value action. The high value actions may correspond to any action taken by the users, the customers, or a third party. For example, high value actions may include "Free Trial", "Coupon Offered", "New Ad", "New Product", "Clearance", "Black Friday Sale", "Discount on Service", "New Services", "Price Reduction", "Purchase of Product", "Purchase of Service", "Outside Event", "Natural", etc.

Figure 2:
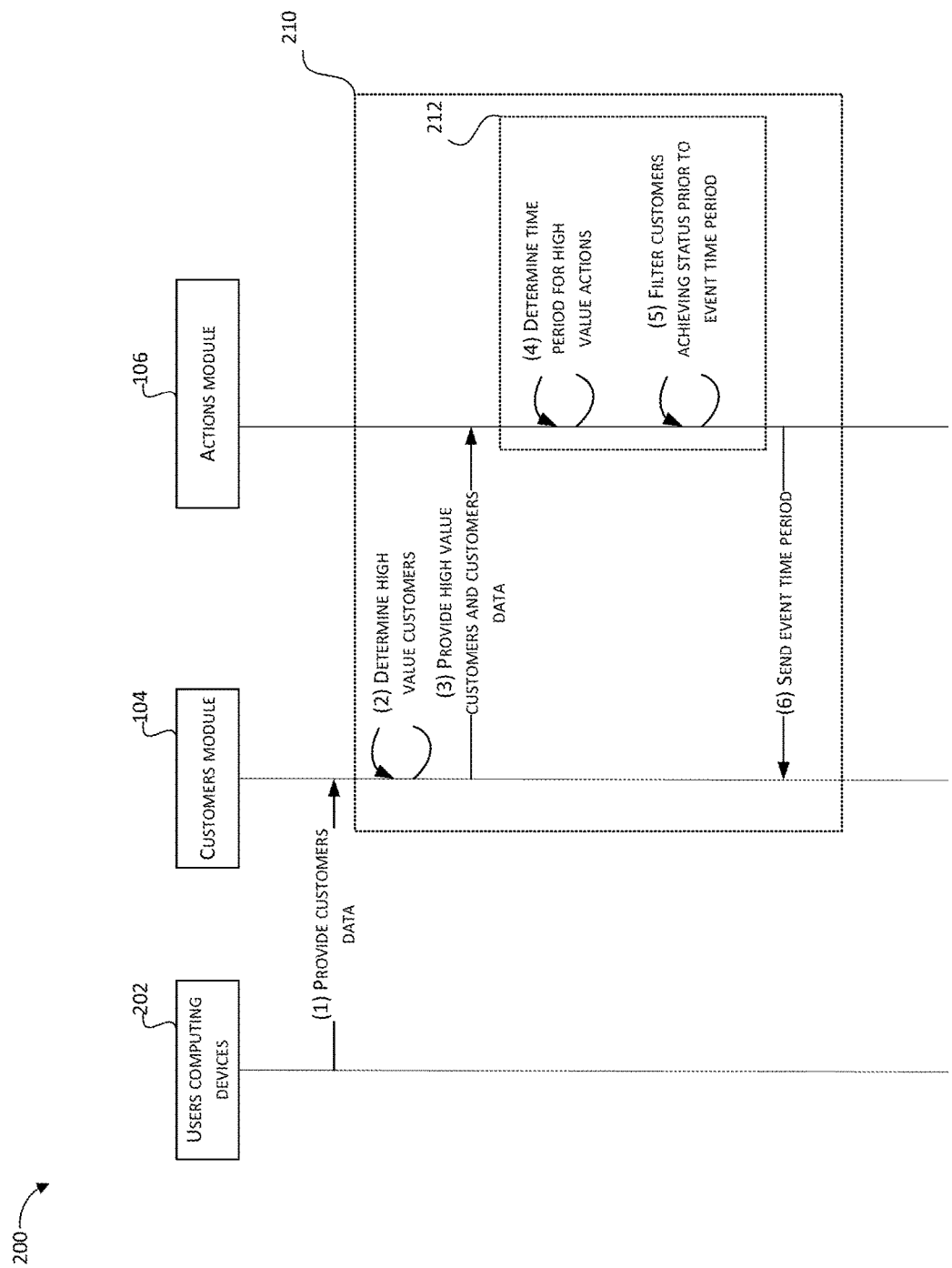
FIG. 2 depicts an example workflow for managing a high value actions service in accordance with aspects of the present disclosure.

FIG. 2 depicts an example workflow for managing a high value actions service 200 in accordance with aspects of the present disclosure. The high value actions service 200 may run automatically or the high value actions service 200 may be initiated based on a determination that customers have become high value customers. In one embodiment, users of the service may specify the parameters to be used for operating the high value actions service 200, such as, for example, (i) high value customers thresholds associated with various customers attributes, (ii) the relevant time period for examination, (iii) high value customers attributes, etc.

As shown in FIG. 2 at (1), the high value actions service 200 receives customers data from customers computing devices 202 in order to monitor a plurality of customers associated with customers computing devices 202. The customers data may correspond to updated customers attributes such as annual spend, website visits per day, hours of TV watched per day, etc. The customers data may further correspond to data associated with a series of actions corresponding to given customers and a time period associated with each action. The customers data may be provided to the high value actions service 200 as the corresponding action occurs. For example, data corresponding to a purchase by customers or a free product offer received by customers may be provided to the high value actions service 200 as it occurs or soon after it occurs. In other embodiments, user interaction data may be stored and maintained by a service or data repository that is separate from and remotely accessible by the customers module (such as a data store maintained in association with a retail server that processes and stores users' interactions with a retail service), and the customers module may obtain historical and/or current customers data individually or in bulk from such a data source. The customers data may also be updated periodically and/or different attributes may be updated at different periods. For example, annual spend may be updated every year and average hours of TV per day may be updated every day. The customers data may be generated by the customers computing devices 202 over an extended period of time (e.g., months, years, etc.). The customers data may be received at a customers module 104. The customers module 104 may be configured to track or obtain customers data of a plurality of customers. The customers module 104 may be configured to update the customers module based on the customers data provided by the customers computing devices 202. In one embodiment, the customers module 104 may store customers data associated with one customers attribute. In another embodiment, the customers module 104 may store customers data associated with a plurality of customers attributes.

At (2), the customers module 104 processes the customers data provided by the customers computing devices 202 to determine the high value customers. The customers module 104 may receive one or more customers attributes thresholds corresponding to customers attributes of the customers data. The customers attributes thresholds may correspond to one or more threshold values for each customers attributes. In one implementation, a customers attributes threshold may correspond to a series of thresholds. The customers module 104 may compare the customers attributes thresholds with the relevant customers data to determine any high value customers. In one embodiment, the customers module 104 may compare multiple customers attributes thresholds with multiple customers attributes of the customers data. Further, the customers module 104 may designate the relevant customers attribute in the designation of high value customers. In another embodiment, the customers module may compare one customers attributes threshold with the relevant customers attribute for the customers. Customers who meet the threshold may be designated by the customers module 104 as high value customers. In another embodiment, customers who surpass the threshold may be designated by the customers module 104 as high value customers.

The customers module 104 may be configured to not store data of customers who are not high value customers. For example, if customers do not satisfy a customers attributes threshold, the customers data corresponding to the customers may not be stored in the customers module 104.

At (3), the customers module 104 provides the high value customers and the customers data to the actions module 106. The high value customers may be provided as a list of high value customers and a list of corresponding customers data including a list of events associated with given customers. In another embodiment, the high value customers may be provided as a list of a high value customers and a time period for the high value customers. The time period may correspond to an event time period associated with a likelihood of a causal relationship between one or more events during the event time period and the customers later achieving high value customers status. In some embodiments, the list of high value customers may be provided at (3), and the actions module 106 may later retrieve customers history data for a relevant time period for those customers from a data store (such as retrieving users history for given users identifier over a certain time period that an individual machine learning model will analyze, as will be further discussed below).

At (4), the actions module 106 determines a first time period to be searched for one or more event time periods. The actions module 106 may implement a series of machine learning models evenly distributed across the time period. Each machine learning model may correspond to a portion of the first time period and may be trained using data associated with high value customers and non-high value customers. The machine learning models may be trained to predict whether an event in the time period associated with the given machine learning model is associated with a later change in the status of given customers from non-high value customers to high value customers. For example, each machine learning model may be trained to predict whether, based on the customers data corresponding to the time period that the given machine learning model is responsible for, customers are high value customers. The data associated with the machine learning models may then be used to plot error metrics to determine a time period associated with a given machine learning model and corresponding with the highest likelihood to represent an event having a causal effect on the customers achieving high value customers status. Based on the identified time period, the machine learning models update the first time period based on the identified time period by the given machine learning model. For example, because time periods further back in time from the point that a given customers became high value customers would typically be expected to have less predictive value or accuracy, a prior time period's model that has an unexpectedly high error rate or predictive ability (such as relative the accuracy of models in surrounding time periods) may be indicative that the given time period's customers data includes a high value action.

At (5), the actions module 106 filters the high value customers that were designated as high value customers prior to the updated first time period to exclude any high value customers that may not be influenced in the determined time period due to the customers already achieving high value customers status. The actions module 106, as mentioned in (3), may receive a time period associated with the given customers data for customers. The actions module 106 may be configured to compare the determined time period from (4) with the received time period from (3). Based on the time periods, the actions module 106 may be configured to exclude any high value customers that had achieved high value customers status prior to the determined time period.

In one embodiment, the actions module 106 includes a loop 212. The actions module 214 may be configured to determine progressively shorter time periods for the high value actions. After determining the progressively shorter time periods, the actions module 214 may be configured to further filter the high value customers that were designated as high value customers prior to the updated time period. For example, a first pass through the loop may include dividing a year into months (where each month has an associated machine learning model to analyze that month's customers data as input). If the month of February is identified as likely including a high value action(s) for given customers, the second pass through the loop may include dividing the month of February into weeks (where each week has an associated machine learning model). The loop 212 may continue until the time period reaches a designated level such as an hour, twelve hours, one day, three days, etc. The designated level may be determined by a users input or by the actions module 106. The loop 212 may be implemented as a set of machine learning models, as will be further described below.

Based on the determined time period in (4) and the filtering of the high value customers in (5), the actions module 106 may determine an event time period for the high value customers. The high value actions service 200 may determine one or more high value actions corresponding to the event time period. The one or more high value actions may represent one or more actions that represent a likelihood of a causal relationship between the one or more high value actions and the customers achieving high value customers status. The one or more high value actions may occur at any time prior to the customers achieving high value customers status. For example, a high value action may occur three months prior to a customers achieving high value customers status. The high value action can correspond to changes in the customers attribute associated with the high value customers and/or other customers attributes. The high value action can correspond to actions by the high value customers and/or actions taken by others affecting the high value customers.

At (6), the actions module 106 provides the one or more high value actions to the customers module 104. The one or more high value actions may be used by the customers module 104 to influence one or more non-high value customers to achieve high value customers status. In one embodiment, the customers module 104 and the actions module 106 includes a loop 210. The loop 210 may include high value actions being designated iteratively or in parallel for the high value customers.

Figure 3:
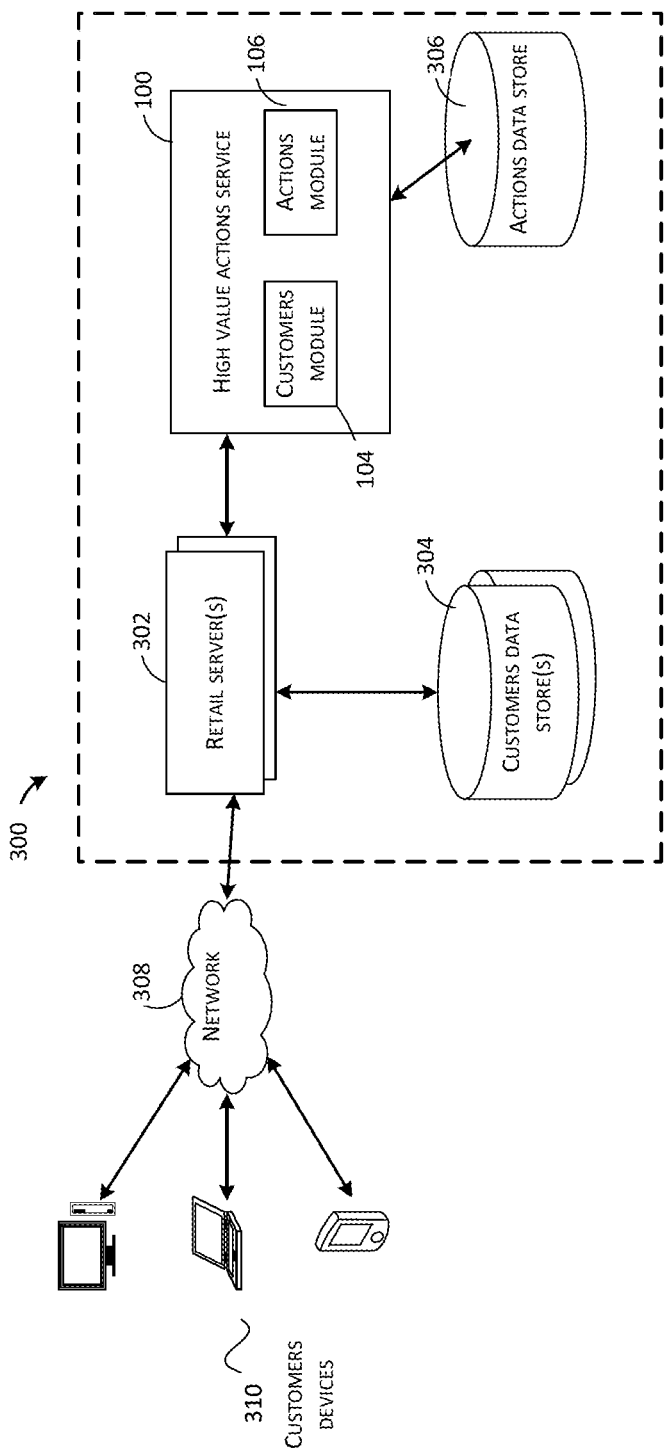
FIG. 3 is a block diagram depicting an illustrative operating environment for identifying high value actions of customers based on attributes of the customers.

FIG. 3 is a block diagram depicting an illustrative operating environment for identifying high value actions of customers of an electronic commerce system 300 based on attributes of the customers. The illustrative operating environment shown in FIG. 2 includes an electronic commerce system 300 that enables customers to request services or product. For example, customers may use the electronic commerce system 300 to watch TV, buy products, browse products or services, etc. The electronic commerce system 300 may include a high value actions service 100 which further includes a customers module 104 and an actions module 106. The electronic commerce system 300 may include an actions data store 306 corresponding to the actions module 106, which may be used to implement various aspects of the present disclosure such as using a machine learning model to analyze high value customers to identify event time periods associated with a likelihood of the customers later achieving the high value customers status. The actions data store 306 may store the machine learning model's data, such as any weight data and other information used in the implementation of the machine learning model. The actions module 106 may be configured to load and interpret the data in the actions data store 306 to perform feature conversion of received item information, implement the machine learning model with respect to provided high value customers, and provide prediction results of the model, in some embodiments. The electronic commerce system 300 may further include a customers data store(s) 304 corresponding to the customers module 104, which may be used to implement various aspects of the present disclosure such as determining high value customers. The customers data store(s) 304 may store data associated with a plurality of customers (e.g., annual spend, site visits per day, etc.), data associated with thresholds associated with one or more customers attributes corresponding to the customers, and data associated with actions or events corresponding to customers. The customers module 104 may be configured to load and interpret the data in the customers data store(s) 304 in order to determine one or more high value customers and/or one or more non-high value customers. The actions module 106 may be configured to load and interpret the data in the customers data store(s) 304 in order to operate the machine learning models and/or train the machine learning models.

The electronic commerce system 300 may also include one or more retail server(s) 302 that facilitate customers use of assorted products and services using various customers devices, such as customers computing devices 310. While a single retail server operated by a single retail entity will often be used herein for illustrative purposes, it will be appreciated that multiple retail servers operated by different retail entities, potentially in different countries, may provide customers data to the electronic commerce system 300, in some embodiments, and may each have their own customers data store(s) and/or actions data store. Customers computing devices 310 may be any of a number of computing devices that are capable of communicating over a network including, but not limited to, a laptop, a personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

Retail server(s) 302 may be connected to and/or in communication with the customers data store(s) 304 that stores information regarding one or more customers interacting with the retail server(s) and collects data regarding these interactions (e.g., annual spend, site visits per day, etc.). The customers data store(s) 304 may provide an identifier to the customers in order to track the interactions of the specific customers. The customers data store(s) 304 may include any information related to one or more of the customers. For example, the customers data store(s) 304 may include the customers attributes 102A and the customers data 102B from FIG. 1. The customers data store(s) 304 may further include, but is not limited to, annual spend of customers, frequency of purchase of customers, hours browsing site per day, etc. It will be understood that any of the customers attributes detailed above or throughout the application may be modified to reference any period of time. For example, a customers attribute may be spend per month, spend per week, spend per day, etc.

The customers data store(s) 304 may store customers attribute information for each of a potentially large number of different customers. It will be appreciated that some customers attributes may be specific to a given class of customers. Customers attributes for a subscriber to a streaming service, for example, may include hours watched, most watched show, videos watched, and add-ons purchased, while customers attributes for customers of a shopping service, for example, may include frequency of purchase, average size of purchase, most commonly purchased item, and annual spend. In some examples, customers may belong to multiple classes of customers and the customers data for the customers may include customers attributes spanning multiple classes. Stored customers data, in some embodiments, may include both customers attributes and customers attribute values. Example customers attributes for given customers, such as a subscriber to streaming service, may include "favorite show", "most watched show", "hours watched total", "hours watched average", etc. A customers attribute value is a value associated with a given customers attribute. For example, the "hours watched average" customers attribute for given customers who is also a subscriber to a streaming service, may have an associated customers attribute value of "2.12 hours per day." In some embodiments, the customers data store(s) 304 may include the same customers attributes for customers. For example, a customers data store(s) 304 may include may include the "hours watched average" customers attribute for subscribers to a streaming service and for customers of a shopping service, but customers attribute values may only be provided for a subset of the customers. Therefore, customers of a shopping service may include "0" or "N/A" in the customers attribute value for the "hours watched average" customers attribute. In one embodiment, the customers attribute value may be left blank for the "hours watched average" customers attribute for customers of a shopping service.

In some embodiments, each of the customers data store(s) 304 and/or the actions data store 306 may be local to the associated retail server(s) 302, may be remote from both the high value actions service 100 and the retail server(s) 302, and/or may be a network-based service itself. The illustrated data stores may be embodied in hard disk drives, solid state memories, any other type of non-transitory computer-readable storage medium, and/or a file, a database, a relational database, in-memory cache, and/or stored in any such non-transitory computer-readable medium accessible to the retail server(s) 302 and/or the high value actions service 100. The data stores may also be distributed or partitioned across multiple local storage devices, or combined into a single storage device, without departing from the spirit and scope of the present disclosure.

In the environment shown in FIG. 3, customers of the electronic commerce system 300 may utilize a customers device 310 to communicate with the retail server(s) 302 via a communication network 308, such as the Internet or other communications link. The network 308 may be any wired network, wireless network, or combination thereof. In addition, the network 308 may be a personal area network, local area network, wide area network, cable network, satellite network, cellular telephone network, etc. or combination thereof. For example, the network 308 may be a publicly accessible network of linked networks, possibly operated by various distinct parties, such as the Internet. In some embodiments, the network 308 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 308 may use protocols and components for communicating via the Internet or any of the other aforementioned types of networks.

The electronic commerce system 300 is depicted in FIG. 3 as operating in a distributed computing environment including several computer systems that are interconnected using one or more computer networks. The electronic commerce system 300 could also operate within a computing environment having a fewer or greater number of devices than are illustrated in FIG. 3. Thus, the depiction of the electronic commerce system 300 in FIG. 3 should be taken as illustrative and not limiting to the present disclosure. For example, the electronic commerce system 300 could implement various Web services components and/or peer-to-peer network configurations to implement at least a portion of the processes described herein.

In brief, the retail server(s) 302 is generally responsible for providing front-end communication with various customers devices, such as the customers devices 310, via the network 308. The front-end communication provided by the retail server(s) 302 may include generating text and/or graphics, possibly organized as a user interface using hypertext transfer or other protocols in response to information inquiries received from the various customers devices. The retail server(s) 302 may obtain information on certain customers from one or more data stores, such as the customers data store(s) 304, as is done in conventional electronic commerce systems. In certain embodiments, the retail server(s) 302 may also access customers data from other data sources, either internal or external to the electronic commerce system 300. In other embodiments, the retail server(s) 302 may also access customers data from the customers devices 310 based on the interaction between the customers devices 310 and the retail server(s) 302. For example, the retail server(s) 302 may track the amount of time spent by a customers device in browsing a catalog via a shopping service or watching a video via a streaming service. In some embodiments other than that illustrated in FIG. 3, the retail server(s) 302 may include or implement a high value actions service, as described herein, such that a separate high value actions service 100 may not be present in certain embodiments.

Figure 4A:
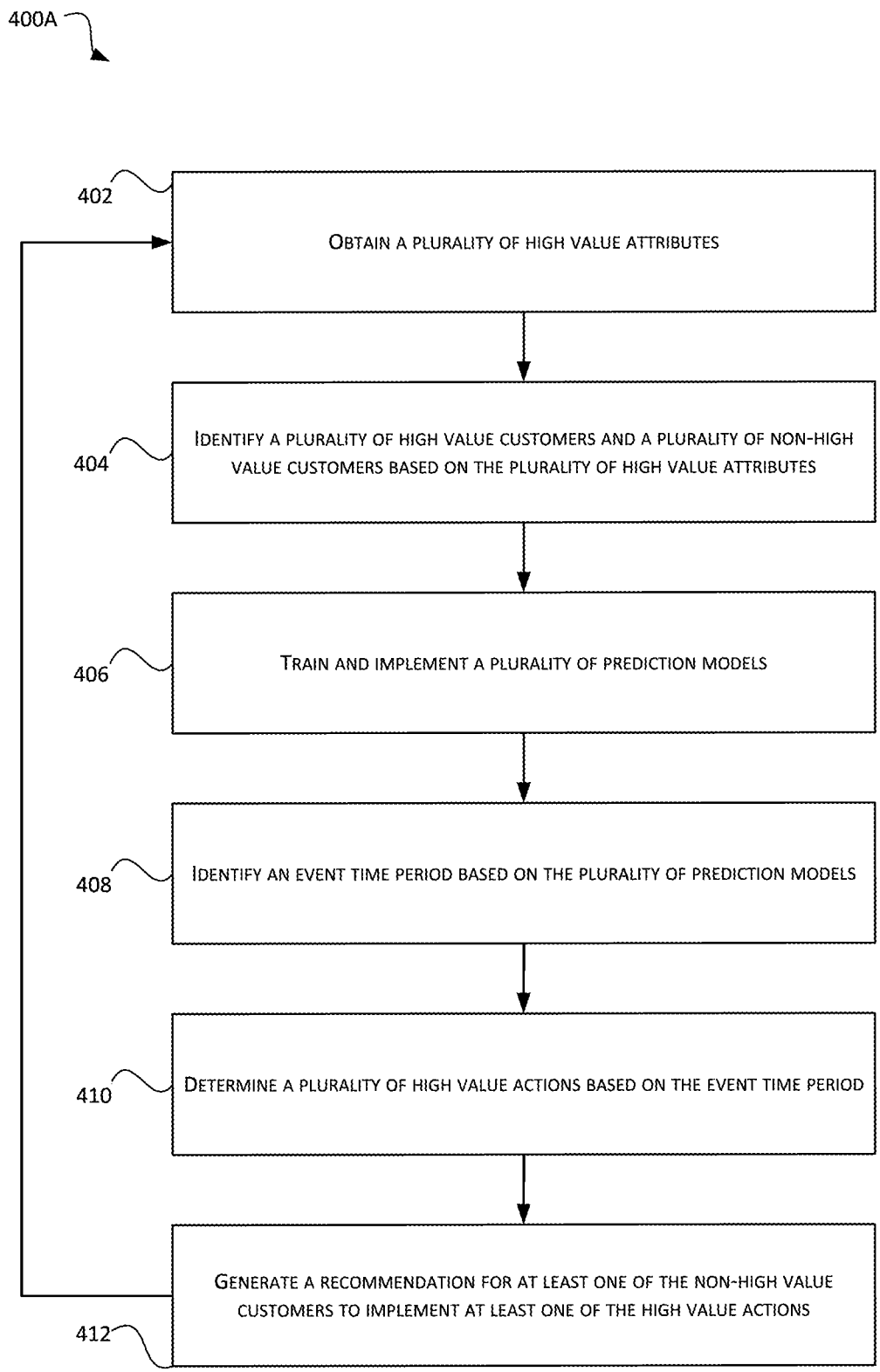
FIG. 4A is a flow diagram depicting an illustrative method for using a machine learning model to identify one or more high value actions and generate a recommendation for one or more high value actions to be performed.

FIG. 4A shows a method 400A executed by a high value actions service 100 as seen in FIG. 1, according to some examples of the disclosed technologies. The high value actions service 100 may be part of the electronic commerce system 300 as seen in FIG. 3. In other embodiments, the method may be performed outside of and independent of any retail environment, such as in environments that are associated with users activity data for a service unrelated to products or purchase behavior, as discussed above.

In a step 402, the high value actions service 100 may obtain a plurality of high value attributes, which may be defined as criteria that when met by customers indicates that the customers are high value customers. Each high value attribute may correspond to a customers attribute and a customers attribute threshold. For example, a high value attribute may correspond to an "Hours of TV Watched" customers attribute which may have a corresponding customers attribute threshold of "120 hours." For an attribute of customers to be considered a high value attribute, the attribute must meet or surpass the customers attribute threshold, in one embodiment. Each customers attribute threshold may include information concerning whether the threshold is a minimum, maximum, whether the customers attribute value may equal the threshold, and/or whether the customers attribute value must exceed the threshold.

In a step 404, the high value actions service 100 may identify a plurality of high value customers and a plurality of non-high value customers based on the obtained plurality of high value attributes. The high value actions service 100 may be configured to receive a plurality of customers. The customers may correspond to customers using one or more services, customers located within in a certain region, customers who have been customers for a certain time period, etc. The customers may be provided as part of the customers data 102 in FIG. 1 or by the customers data store(s) 304 in FIG. 3. In one implementation, the high value actions service 100 may be configured to detect a number of customers. The high value actions service 100 may also receive a collection of customers data from the customers data store(s) 304 of FIG. 3 including a plurality of information concerning a plurality of customers attributes. At least one of the plurality of customers attributes in the customers data may correspond to the high value attributes identified in step 402. The high value actions service 100 may be configured to identify a plurality of high value customers by comparing the high value attributes with the corresponding customers attributes of the customers. Based on the requirements of each high value attributes, the high value actions service 100 may compare each high value attribute to see if it is less than, greater than, or equal to a customers attribute. The high value actions service 100 may then designate the customers that meets at least one high value attribute as high value customers and the customers that do not meet at least one high value attribute as non-high value customers. In one implementation, the high value actions service 100 may designate customers that satisfies a plurality of high value attributes as high value customers and customers that do not satisfy the plurality of high value attributes as a non-high value customers. It will be understood that the high value actions service 100 may require customers to meet any number of high value attributes to be considered a high value customers. In one implementation, the high value actions service 100 may receive a designation indicating which customers are considered high-value customers and which are considered non-high value customers for a given time period.

The high value actions service 100 may further identify customers data associated with customers. The customers data may include information about events or actions that given customers have taken with regards to the retailer. For example, the customers data may include information about programs or services that customers have participated in and the level of participation. The customers data may also include information concerning purchases of the customers. Further, the customers data may include information about actions taken by a given retailer for the customers and any responses by the customers to the retailer's actions. For example, the customers data may include information about coupons or free trials offered by the retailer to the customers and any customers actions that could correspond to the retailer's actions. The customers data may further include information about events or actions that given customers have taken that do or do not correspond directly to the retailer. For example, the customers data may include information about purchases of the customers, both purchases from the retailer and from other retailers. In some embodiments, the customers data may include information provided by third party services or information provided by the customers themselves. For example, customers may change a shipping or billing address as listed by the retailer and the retailer may modify the customers data to reflect that the customers have moved.

In a step 406, the high value actions service 100 may train and implement a plurality of prediction models. The plurality of prediction models may be trained to identify or determine relationships between customers information at a first time, based on the customers data, and customers information or status at a second time, such as predicting whether the customers are high value customers at the second time. The plurality of prediction models may be trained using data of a large number of customers of a given retailer, including high value customers and non-high value customers. For example, the plurality of prediction models may be trained to identify an action or event at a first point in time that caused a corresponding action or event at a second point in time based on data associated with high value and non-high value customers. The first and second point in time may be separated by hours, days, months, years, etc.

The high value actions service 100 may first convert or translate some or all of the received or retrieved customers data into appropriate feature formatting expected by the plurality of prediction models. In performing the translation or conversion, the high value actions service 100 may retrieve formatting or conversion data from actions data store 306. Once the customers data is in a proper form expected by the plurality of prediction models, the high value actions service 100 may provide the customers data as input to the plurality of prediction models. The customers data may include a plurality of information associated with events or actions corresponding to given customers. The plurality of prediction models may conduct iterative operations on data associated with the high value customers. The plurality of prediction models may be a neural network. In other implementations, the plurality of prediction models may be another configuration or implementation of a machine learning model, such as using linear regression or various deep learning techniques. The plurality of prediction models may provide highly non-linear processing of the data associated with high value customers. An example of the plurality of prediction models will be further explained in FIG. 4B.

In a step 408, the plurality of prediction models may identify an event time period for the high value customers based on the plurality of prediction models. The event time period may correspond to customers achieving high value customers status at a later time period. For example, the event time period determined for given customers may be the time period during which the machine learning models (discussed below with respect to FIG. 4B) indicate a high value action likely occurred, such as due to an increased predictive accuracy of the model that was given that time period's data for the customers as input.

In a step 410, the high value actions service 100 may determine a plurality of high value actions based on the event time period in order to identify actions that represent a likelihood of correlation to customers achieving high value customers status. The high value actions service 100 may identify one or more high value actions for high value customers. In one implementation, a high value action may comprise a plurality of high value actions or a sequence of high value actions. The high value actions service 100 may be unable to identify one or more high value actions for high value customers. The high value action service 100 may determine that one or more high value actions cannot be determined because the growth of the customers into high value customers was organic or because the event that caused the growth of the customers into high value customers was not captured in the customers data. For example, the high value actions service 100 may be unable to capture certain events, such as receiving an in-person recommendation to try a service, and may designate such unknown high value actions as occurring outside of the system. Further, the high value actions service 100 may be unable to correlate customers growth into high value customers to any time period and may determine that the customers growth was organic.

The plurality of prediction models may generate an event probability for each high value action to identify the probability that a given high value action corresponds to given customers shifting to high value customers status. The event probability may be based on previous high value actions determined by the plurality of prediction models. For example, the plurality of prediction models may determine that a greater percentage of high value customers correspond to a "Free Trial" high value action than a "No Ads" high value action. The plurality of prediction models may therefore represent the "Free Trial" high value action with a greater event probability than a "No Ads" high value action. In one embodiment, the event probability may be based on previous high value actions of high value customers grouped according to their high value attributes. For example, high value customers with an "Annual Spend" high value attribute may be grouped with other high value customers sharing the same high value attribute. Further, high value customers with multiple high value attributes may be grouped with other high value customers sharing each of the multiple high value attributes. The plurality of prediction models may base the determination of a high value action on the corresponding probability. For example, the plurality of prediction models may be more likely to represent a first action as a high value action than a second action based on the event probabilities. In other embodiments, the plurality of prediction models may not base the determination of a high value action on the corresponding probability and may include the event probability with the corresponding high value action. In other embodiments, the plurality of prediction models may not be configured to track or calculate the event probability of one or more high value actions.

In a step 412, the high value actions service 100 may generate a recommendation for at least one of the non-high value customers to implement at least one of the high value actions in order to influence the non-high value customers to achieve high value customers status. The high value actions service 100 may further generate a prompt to perform one or more high value actions and deliver the prompt to one or more non-high value customers. In one example, the high value actions service 100 receives a page request by non-high value customers and generates a response to the page request which includes a prompt to perform a high value action. The high value actions service 100 may further modify the retail server(s) 302 for non-high value customers to encourage the non-high value customers to perform a high value action. For example, the high value actions service 100 may modify the non-high value customers experience on the retail server(s) 302 by more frequently generating coupons, offering free trials, or implementing any other action related to a high value action. In another implementation, the high value actions service 100 may provide the non-high value customers and the high value actions to one or more other servers in order for the one or more other servers to influence the non-high value customers to implement a high value action. The method 400A then returns to the step 402, as shown above.

Figure 4B:
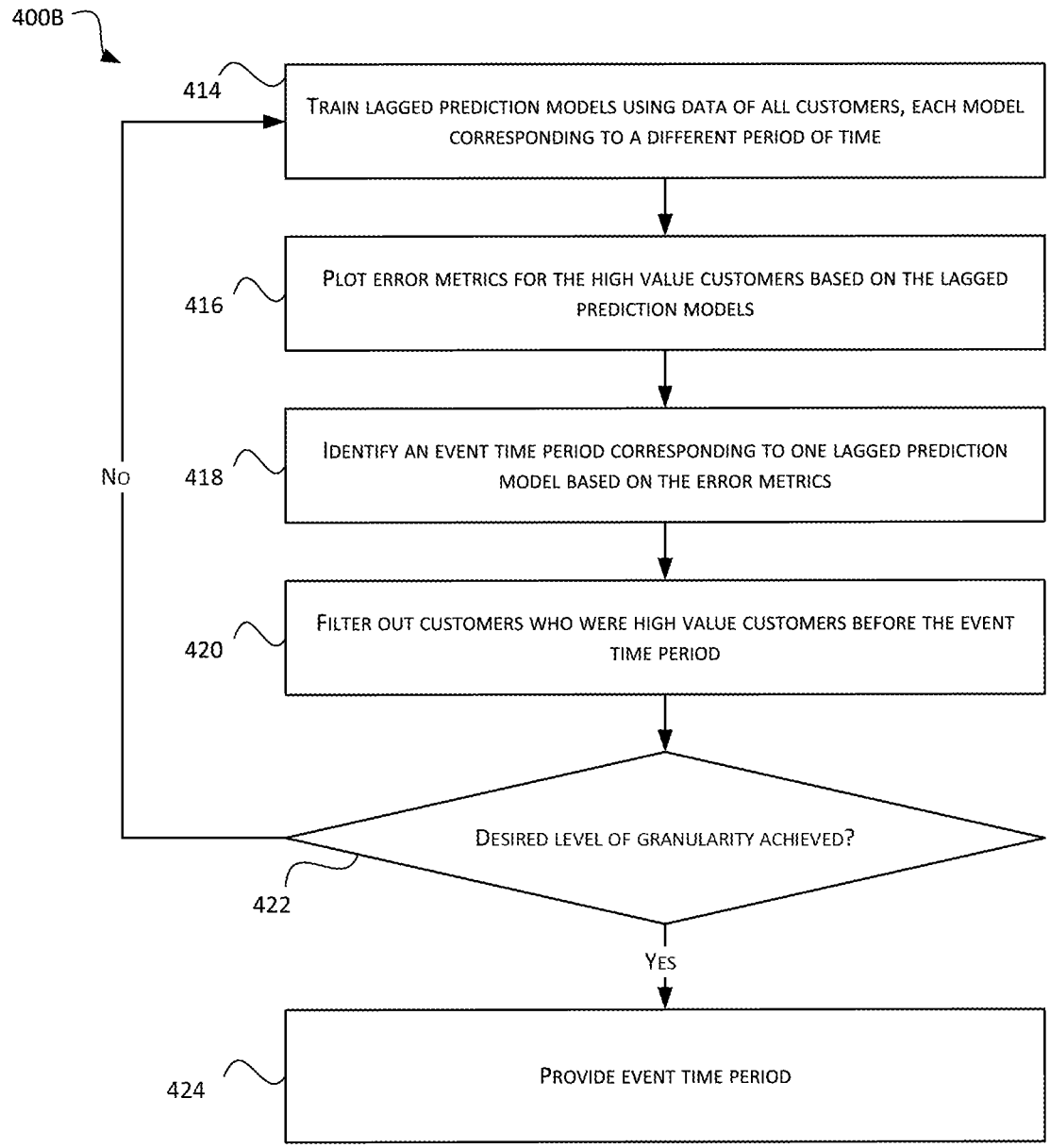
FIG. 4B is a flow diagram depicting an example method for training and implementing a plurality of lagged prediction models.

FIG. 4B shows a method 400B executed by a high value actions service 100 as seen in FIG. 1, according to some examples of the disclosed technologies. The high value actions service 100 may be part of the electronic commerce system 300 as seen in FIG. 3. The method 400B corresponds to step 406 of FIG. 4A and is one example implementation of step 406 of FIG. 4A. In the example method 400B, the plurality of prediction models corresponds to a plurality or sequence of lagged prediction models.

In a step 414, the high value actions service 100 identifies a first time period for the plurality of lagged prediction models and the plurality of lagged prediction models are trained using data of the customers based on the time period. The plurality of lagged prediction models may be provided a time period including a window of time steps. Each of the plurality of lagged prediction models may be configured to predict an outcome for a given time step of the time period. For example, if the first time period corresponds to the calendar year 2019, the high value actions service 100 may include 12 machine learning models and each machine learning model may correspond to a month in 2019 i.e., a first machine learning model may correspond to January 2019, a second machine learning model may correspond to February 2019, etc. Each of the machine learning models may be trained to predict for the given time period, e.g., January 2019, whether customers will have a high value customers status at the later time (such as at the end of 2019) based on input data covering the given time period (e.g., actions taken by the customers in January 2019). Each of the machine learning models may be trained using data of both high value customers and non-high value customers.

In a step 416, the plurality of lagged prediction models may identify high value customers who were not high value customers before the first time period and who were high value customers after the first time period and plot error metrics for each of these high value customers based on the trained plurality of lagged prediction models. The error metrics correspond to the success of each prediction model in predicting the effect of actions occurring in the corresponding time period. In some implementations, the error metrics correspond to a linear plot as machine learning models corresponding to a time period located further from the status change time period may have a higher error. As the distance decreases between the given time period and the status change time period, the error of the prediction model should decrease. Any change in the error metrics such as a knee may indicate an event time period likely to include a high value action. The error metrics may correspond to any error metrics (e.g., Mean Squared Error, Root Mean Square Error, Mean Absolute Square Error, etc.). The error metrics may compare estimated outputs associated with a function of the customers, based on previous outputs of the function associated with the customers, with actual outputs associated with the function of the customers to calculate an error metric. The error metrics may correspond to the first time period identified in step 414.

In a step 418, the high value actions service 100 identifies, from the plurality of lagged prediction models, an event time period likely to include a high value action based on the error metrics for the customers for each model. The identified time period (such as a particular month, in an example where each model was provided input data for a different month) may correspond to a point on the error metric indicating a shift in the accuracy of the error metric, such as increased predictive accuracy than would be expected in the given period based on the time lag imposed on the input data. The one or more event time periods may correspond to possible event time periods for the respective customers.

In a step 420, the high value actions service 100 may filter out high value customers who were high value customers before the identified time period. For example, if given customers were already high value customers at the start of a given month, then the actions taken within that month were not what caused the customers to be initially elevated to high value customers status, so there is no need to analyze individual weeks or days of data within that month for the given customers on a next pass through the loop illustrated in FIG. 4B.

In a step 422, the high value actions service 100 may receive the identified time period as a subset of the first time period (such as a particular month of the originally selected year) and the high value actions service 100 may determine if a desired level of granularity is achieved (e.g., if the specific time period is small enough to pinpoint a specific high value action or series of actions). If the desired level of granularity is not achieved, the method then returns to step 414 and the selected time period is provided as the first time period for the next iteration in step 414. For example, on the second pass a selected month may be divided into different weeks, on the third pass a selected week may be divided into days, and so on. It will be appreciated that other time periods may be used, such as starting with time periods of 100 days, then 10 days, then 1 day, etc. The method 400B may loop iteratively until a sufficiently small specific time period is achieved. For example, the method 400B may repeat until the specific time period becomes a day, an hour, or other period. In another embodiment, the method 400B may repeat until the specific time period becomes small enough to identify one action corresponding to the specific time period, such as by dynamically checking in a given instance if the amount of customers actions or other customers data in the given time period is small enough to confidently select at least one high value action from the data.

In a step 424, the plurality of lagged prediction models, based on the specific time period, provide an event time period corresponding to high value customers in which a high value action seemed to have occurred. For example, the method may return an indication of the specific day or hour (depending on the embodiment) that contains a high value action or series of high value actions. The method 400A may then continue at step 408. In the example methods 400A and 400B, each method may be configured to determine one or more high value actions for high value customers and may provide data corresponding to each of the high value actions to the high value actions service.

Figure 5:
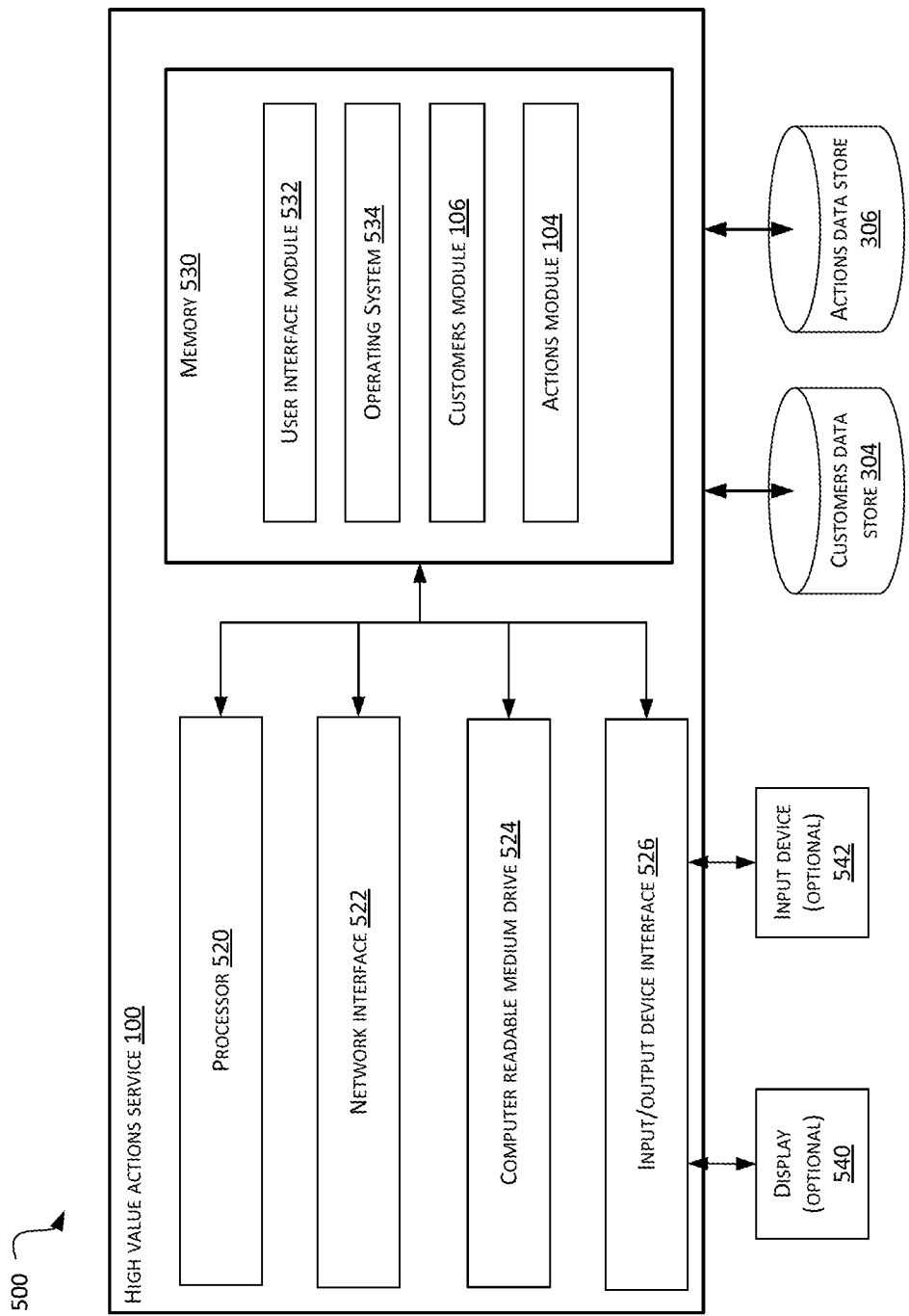
FIG. 5 depicts a general architecture of an example computing device providing a high value actions service.

FIG. 5 depicts a general architecture 500 of a computing system (referenced as high value actions service 100) configured to implement various aspects of the present disclosure. The generally architecture of the high value actions service 100 depicted in FIG. 5 includes an arrangement of computer hardware and software components. The high value actions service 100 may include many more (or fewer) elements than those shown in FIG. 5. As illustrated the high value actions service 100 includes a processor 520, a network interface 522, a computer readable medium drive 524, an input/output device interface 526, a display 540, and an input device 542, all of which may communicate with one another by way of a communication bus. The network interface 522 may provide connectivity to one or more networks or computing systems. The processor 520 may thus receive information and instructions from other computing systems or services via the network 308. The processor 520 may also communicate to and from memory 530 and further provide output information for an optional display 540 via the input/output device interface 526. The input/output device interface 526 may also accept input from the optional input device 542, such as a keyboard, mouse, digital pen, microphone, touch screen, gesture recognition system, voice recognition system, gamepad, accelerometer, gyroscope, or other input device.

The memory 530 may contain computer program instructions (grouped as modules or components in some embodiments) that the processor 520 executes in order to implement one or more embodiments. The memory 530 generally includes RAM, ROM, and/or other persistent, auxiliary, or non-transitory computer readable media. The memory 530 may store an operating system 534 that provides computer program instructions for use by the processor 520 in the general administration and operation of the high value actions service 100. The memory 530 may further include computer program instructions and other information for implementing aspects of the present disclosure. For example, in one embodiment, the memory 530 includes a user interface module 532 that generates user interfaces (and/or instructions therefor) for display upon a computing device, e.g., via a navigation interface such as a browser or application installed on the computing device. In addition, memory 530 may include or communicate with customers data store(s) 304, actions data store 306, and/or one or more other data stores. For example, the high value actions service 100 may retrieve customers attribute information directly from customers data store(s) 304 and information pertaining to high value actions or high value customers directly from actions data store 306. In one embodiment, the high value actions service 100 may receive such data indirectly from the retail server(s) 302. The high value actions service 100 may also be configured to store information corresponding to high value actions in the actions data store 306.

While actions module 104 and/or customers module 104 are shown in FIG. 5 as part of the high value actions service 100, in other embodiments, all or a portion of the actions module 104 and/or the customers module 104 may be implemented by the retail server(s) 302 and/or another computing device. In some embodiments, the retail server(s) 302 may include several components that operate similarly to the components illustrated as part of the high value actions service 100, including an actions module, customers module, processor, computer readable medium drive, etc. In some embodiments, a separate high value actions service 100 may not be required or needed.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
as implemented by one or more computing devices configured with specific executable instructions:
determining a first set of users who each meet one or more criteria at a second time, wherein the first set of users did not meet the one or more criteria at a first time prior to the second time, wherein the criteria relates to a status of the first set of users as high value users;
providing information associated with activity of the first set of users to a plurality of machine learning models, wherein each machine learning model is trained to predict the one or more criteria for users at the second time based on activity of the users during a prior time period, the one or more criteria used to identify the users as high value users, wherein the plurality of machine learning models are each trained with respect to different prior time periods, wherein the different prior time periods each comprise a different subset of time between the first time and the second time;
identifying, for individual users of the first set of users, a qualifying subset of time from among the different prior time periods based at least in part on accuracy of predications made by each of the plurality of machine learning models, wherein the qualifying subset of time is selected based at least in part on a determination that the qualifying subset of time is more likely than other prior time periods to include users activity information that correlates with the individual users becoming high value users;
identifying, for individual users of the first set of users, one or more qualifying events occurring in the qualifying subset of time identified for the individual users;
determining a second set of users who do not meet the one or more criteria;
receiving a page request by a user of the second set of users; and
generating a response to the page request, wherein the response to the page request includes a prompt to perform the one or more qualifying events.

2. The method of claim 1, wherein the first set of users comprises a first user and a second user, wherein the first user corresponds to a first qualifying event and the second user corresponds to a second qualifying event, wherein the first qualifying event and the second qualifying event are different events.

3. The method of claim 1, wherein the first set of users comprises a first user and a second user, wherein the first user corresponds to a first qualifying event and the second user corresponds to a second qualifying event, wherein the first qualifying event and the second qualifying event are a same event.

4. The method of claim 1, wherein the one or more qualifying events for first users comprises a plurality of qualifying events.

5. A computer-implemented method comprising:
as implemented by one or more computing devices configured with specific executable instructions;
determining a first set of users who meet one or more criteria at a certain time;
determining, using a plurality of machine learning models, for users of the first set of users, for each of a plurality of time periods prior to the certain time, a likelihood that an action in given time period correlates with given users meeting the one or more criteria at the certain time, wherein information associated with activity of the given users is provided as input to the plurality of machine learning models, wherein each machine learning model of the plurality of machine learning models corresponds to a respective time period of the plurality of time periods, and wherein each machine learning model of the plurality of machine learning models is trained to predict the one or more criteria for the given users at the certain time;
selecting, from among the plurality of time periods, a qualifying time period for users of the first set of users, wherein the qualifying time period for an individual user of the first set of users is selected based on the determined likelihood for each of the plurality of time periods for the individual user; and
determining one or more events for users of the first set of users, the one or more events occurring during the qualifying time period selected for given users, wherein the one or more events are determined to correlate with the given users meeting the one or more criteria at the certain time.

6. The method of claim 5, wherein said determining, using the plurality of machine learning models, for users of the first set of users, for each of the plurality of time periods, the likelihood that the action in the given time period correlates with the given users meeting the one or more criteria at the certain time comprises:
implementing the plurality of machine learning models, each of the plurality of machine learning models configured to, for the given users:
obtain a time period associated with the given users,
produce a plurality of subsets of the given time period, wherein each machine learning model of the plurality of machine learning models predicts the one or more criteria for the given users at the certain time based on the information associated with the activity of the given users, wherein the activity of the given users is an activity of the given users at a first time of the given time period, and
generate the qualifying time period based on the plurality of subsets of the time period.

7. The method of claim 5, wherein each machine learning model of the plurality of machine models is further trained to predict the one or more criteria for the given users at the certain time based on the information associated with the activity of the given users, wherein the activity of the given users is activity of the given users at a first time of the given time period.

8. The method of claim 5, wherein said determining the one or more events for users of the first set of users is based at least in part on one or more qualifying events for users of a prior set of users.

9. The method of claim 5, wherein said determining the one or more events for users of the first set of users comprises determining a plurality of events unrelated with the given users meeting the one or more criteria at the subsequent time.

10. The method of claim 5, wherein the first set of users comprises a first user and a second user, wherein the first user corresponds to a first qualifying event and the second user corresponds to a second qualifying event, wherein the first qualifying event and the second qualifying event are different events.

11. The method of claim 5, further comprising:
determining a second set of users who do not meet the one or more criteria;
receiving a page request by a user of the second set of users; and
generating a response to the page request, wherein the response to the page request includes one of (a) a prompt to perform the one or more events or (b) content generated as a result of a system performing the one or more events.

12. A system comprising:
an attributes data store for storing one or more attributes for customers;
a customers data store for storing data associated with the customers; and
a hardware processor in communication with the attributes data store and the customers data store, the hardware processor configured to execute computer-executable instructions to at least:
obtain, from the attributes data store, the one or more attributes, the one or more attributes correlating to one or more features of a set of qualifying customers;
obtain, from the customers data store, the data associated with the customers;
determine, from the customers, the set of qualifying customers who meet the one or more attributes;
determine, using a plurality of machine learning models, for qualifying customers of the set of qualifying customers, for each of a plurality of time periods, a likelihood that an action in a given time period correlates with given qualifying customers meeting the one or more attributes at a subsequent time, wherein information associated with activity of the given qualifying customers is provided as input to the plurality of machine learning models, wherein each machine learning model of the plurality of machine learning models corresponds to a respective time period of the plurality of time periods, and wherein each machine learning model of the plurality of machine learning models is trained to predict the one or more attributes for the given qualifying customers at the subsequent time;
select a qualifying time period for qualifying customers of the set of qualifying customers, wherein the qualifying time period is selected based on the determined likelihood for each of the plurality of time periods; and
determine one or more events for qualifying customers of the set of qualifying customers, the one or more events corresponding to a respective qualifying time period, the one or more events correlating with given qualifying customers meeting the one or more attributes at the subsequent time.

13. The system of claim 12, wherein to determine, using the plurality of machine learning models, for qualifying customers of the set of qualifying customers, for each of the plurality of time periods, the likelihood that the action in the given time period correlates with the given qualifying customers meeting the one or more attributes at the subsequent time, the hardware processor is further configured to execute further computer-executable instructions to at least: implement the plurality of machine learning models, each of the plurality of machine learning models configured to, for the given qualifying customers:
obtain a time period associated with the given qualifying customers,
produce a plurality of subsets of the time period, wherein each machine learning model of the plurality of machine learning models predicts the one or more attributes for the given qualifying customers at a second time of the time period based on the information associated with the activity of the given qualifying customers, wherein the activity of the given qualifying customers is an activity of the given qualifying customers at a first time of the time period, and
generate the qualifying time period based on the plurality of subsets of the time period.

14. The system of claim 13, wherein the given qualifying customers of the set of qualifying customers did not meet the one or more attributes at the first time.

15. The system of claim 12, wherein each machine learning model of the plurality of machine models is further trained to predict one or more attributes for the given qualifying customers at the subsequent time based on the information associated with the activity of the given qualifying customers, wherein the activity of the given qualifying customers is activity of the given qualifying customers at a first time.

16. The system of claim 12, wherein said determining the one or more events for qualifying customers of the set of qualifying customers is based at least in part on one or more events for qualifying customers of a prior set of qualifying customers.

17. The system of claim 12, wherein to determine the one or more events for qualifying customers of the set of qualifying customers, the hardware processor is further configured to execute further computer-executable instructions to at least determine a plurality of events unrelated with the given qualifying customers meeting the one or more attributes at the subsequent time.

18. The system of claim 12, wherein the set of qualifying customers comprises a first qualifying customer and a second qualifying customer, wherein the first qualifying customer corresponds to a first event and the second qualifying customer corresponds to a second event, wherein the first event and the second event are different events.

19. The system of claim 12, wherein the set of qualifying customers comprises a first qualifying customer and a second qualifying customer, wherein the first qualifying customer corresponds to a first event and the second qualifying customer corresponds to a second event, wherein the first event and the second event are a same event.

20. The system of claim 12, wherein the hardware processor is further configured to execute further computer-executable instructions to at least:
determine, from the customers, a set of non-qualifying customers who do not meet the one or more attributes; and
transmit to a non-qualifying customer of the set of non-qualifying customers a prompt to perform the one or more events.

* * * * *